United States Patent
Su et al.

(10) Patent No.: US 10,934,203 B2
(45) Date of Patent: Mar. 2, 2021

(54) THERMOFORMING METHOD AND THERMOFORMING DEVICE FOR GLASS PRODUCT

(71) Applicant: AAC Technologies Pte. Ltd., Singapore (SG)

(72) Inventors: Wei Su, Shenzhen (CN); Bo Xu, Shenzhen (CN); Xuefeng Liu, Shenzhen (CN); Shaolin He, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 242 days.

(21) Appl. No.: 16/112,916

(22) Filed: Aug. 27, 2018

(65) Prior Publication Data
US 2019/0152829 A1    May 23, 2019

(30) Foreign Application Priority Data
Nov. 17, 2017  (CN) .......................... 201711143561.7

(51) Int. Cl.
*C03B 23/03* (2006.01)
*C03B 25/06* (2006.01)

(52) U.S. Cl.
CPC ...... *C03B 23/0305* (2013.01); *C03B 23/0307* (2013.01); *C03B 25/06* (2013.01); *Y02P 40/57* (2015.11)

(58) Field of Classification Search
CPC . C03B 23/03; C03B 23/0302; C03B 23/0307; C03B 23/023; C03B 2215/68
See application file for complete search history.

(56) References Cited

U.S. PATENT DOCUMENTS

| 5,697,996 A * | 12/1997 | Tsuda | B30B 11/022 264/40.5 |
| 6,813,906 B1 * | 11/2004 | Hirota | C03B 11/08 425/352 |
| 2011/0167872 A1 * | 7/2011 | Ogura | C03B 11/08 65/66 |
| 2012/0216573 A1 * | 8/2012 | Dannoux | C03B 29/08 65/104 |
| 2015/0376051 A1 * | 12/2015 | Aniya | C03B 7/12 501/46 |

* cited by examiner

*Primary Examiner* — Cynthia Szewczyk
(74) *Attorney, Agent, or Firm* — IPro, PLLC; Na Xu

(57) ABSTRACT

The present disclosure provides a thermoforming method and a thermoforming device for a glass product. The method comprises the following steps of: providing a thermoforming mold, wherein the thermoforming mold comprises a lower mold and an upper mold arranged above the lower mold and matched therewith, and providing a mold opening component; a pressurizing process, wherein a glass sheet placed in the thermoforming mold and at a softening point temperature and above is hot-pressed to form a glass product; a cooling process, wherein the glass product placed in the thermoforming mold is cooled, and when the temperature of the glass product drops to a glass point transformation temperature and below, the upper mold is opened by the mold opening component so that the upper mold is separated from the lower mold; and taking the glass product out when the temperature of the glass product in the thermoforming mold drops to a room temperature. The thermoforming method improves the molding quality of the glass product and enhances the manufacturing yield of the glass product.

2 Claims, 11 Drawing Sheets

THERMOFORMING METHOD AND THERMOFORMING DEVICE FOR GLASS PRODUCT

CROSS-REFERENCE TO RELATED APPLICATIONS

This application claims the priority benefit of Chinese Patent Applications Ser. No. 201711143561.7 filed on Nov. 17, 2017, the entire content of which is incorporated herein by reference.

FIELD OF THE PRESENT DISCLOSURE

The present disclosure relates to the technical field of glass product molding, and more particularly, to a thermoforming method and a thermoforming device for a glass product.

DESCRIPTION OF RELATED ART

A glass product is bent and molded by a thermoforming device. When the glass product is thermoformed, a glass sheet is put into a thermoforming mold firstly, and the glass sheet moves to a molding chamber along with the thermoforming mold. The glass sheet is gradually heated through a plurality of heating stations, and a temperature of the glass sheet is gradually increased from a room temperature $T_0$ to a softening point temperature $T_3$. In the warm-up preheating stage, the thermoforming mold does not apply pressure to the glass sheet.

When the glass sheet is completely preheated and reaches the softening point temperature $T_3$, the glass sheet is transported to each pressurizing station. The pressurizing station applies a pressure to an upper mold by a cylinder or a motor, and the upper mold is held down by the pressure so that the upper mold moves downwards, and the upper mold and a lower mold of the thermoforming mold are clamped, and the glass sheet is bent and deformed. A plurality of pressurizing stations can be provided. The glass sequentially passes through the pressurizing stations and is gradually pressed and molded.

After being hot-bent and molded, the glass sheet also needs to be cooled. At this time, the hot-bent glass product is transported to the cooling stations. After passing through two (or more) cooling stations, the temperature of the glass product decreases and approaches to the room temperature $T_0$, the thermoforming mold moves to the outside of the cooling station, and the mold is opened to take the molded glass product out from a hot bending machine, and the hot bending process of the glass product is ended.

However, since the materials used for the thermoforming mold are usually materials such as graphite, metals, and ceramics, the thermal expansion coefficients of the above-mentioned materials are different from that of the glass material, and there are differences in the shrinkage rates of different materials when the materials are cooled in the cooling station, the glass product has the risk of bursting or fracturing, especially when the glass product has a large bending angle or a complex shape, the risk of cracking increases significantly. In addition, due to factors such as gravity of the thermoforming mold itself, the size of the glass product will also change, thereby reducing the manufacturing yield of the glass product.

REFERENCE NUMERALS

100—thermoforming device;
  2—thermoforming mold;
    202—upper mold;
    204—lower mold;
      2022—connecting trough
      2042—vertical post
      2044—through hole;
  4—heating station;
  6—pressurizing station;
  8—cooling station;
 10—mold opening component;
    102—force applying portion;
    104—magnetic portion;
    106—adsorption portion; and
 12—holding portion.

The accompanying drawings herein are incorporated in and constitute a part of this description, illustrate the embodiments in conformity with the disclosure, and serve to explain the principles of the disclosure together with the description.

DETAILED DESCRIPTION OF THE EXEMPLARY EMBODIMENTS

The disclosure will be further described in detail below through specific embodiments and with reference to the accompanying drawings.

Figure 1:
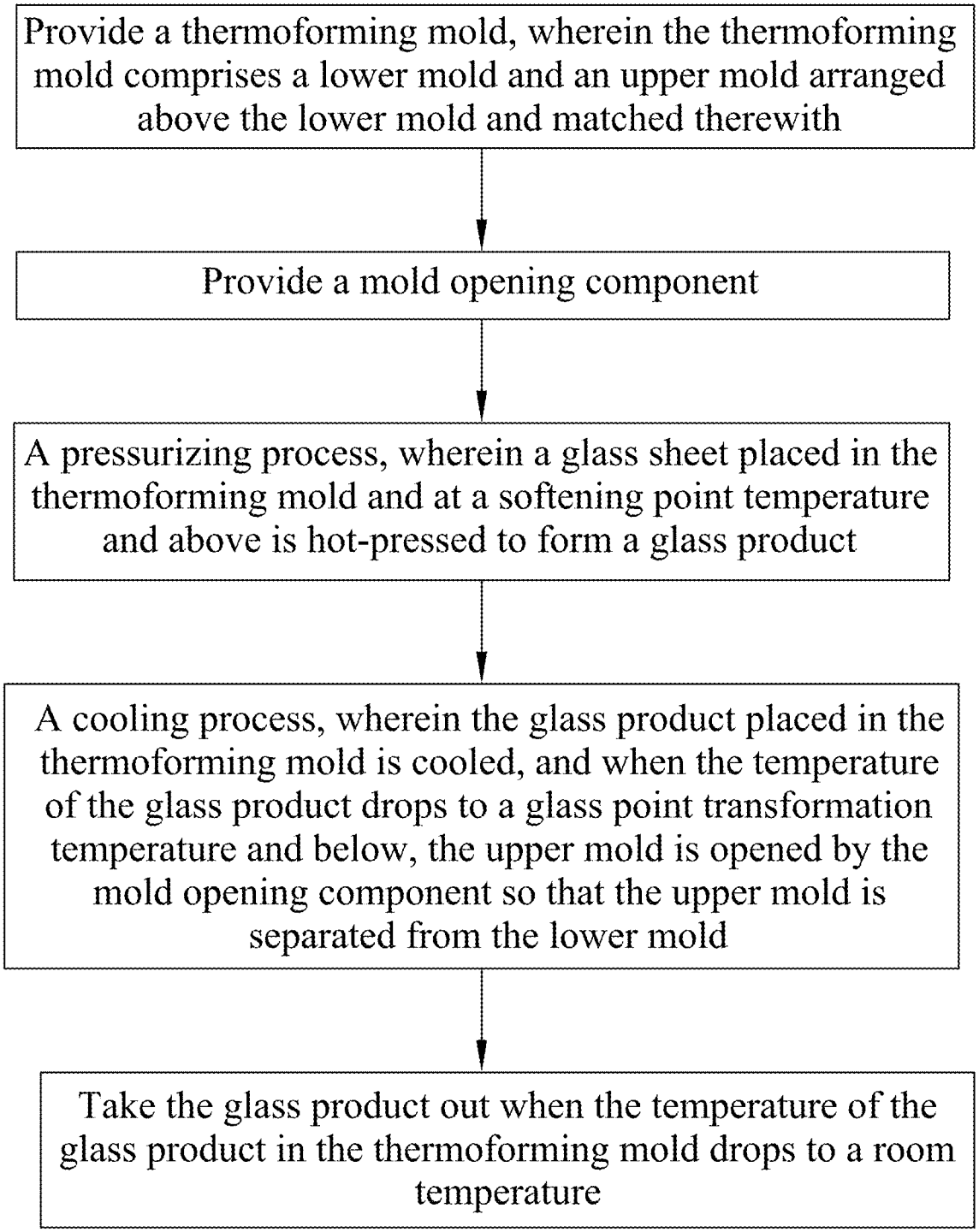
FIG. 1 is a schematic diagram of a thermoforming method provided by an embodiment of the present disclosure.
Figure 2:
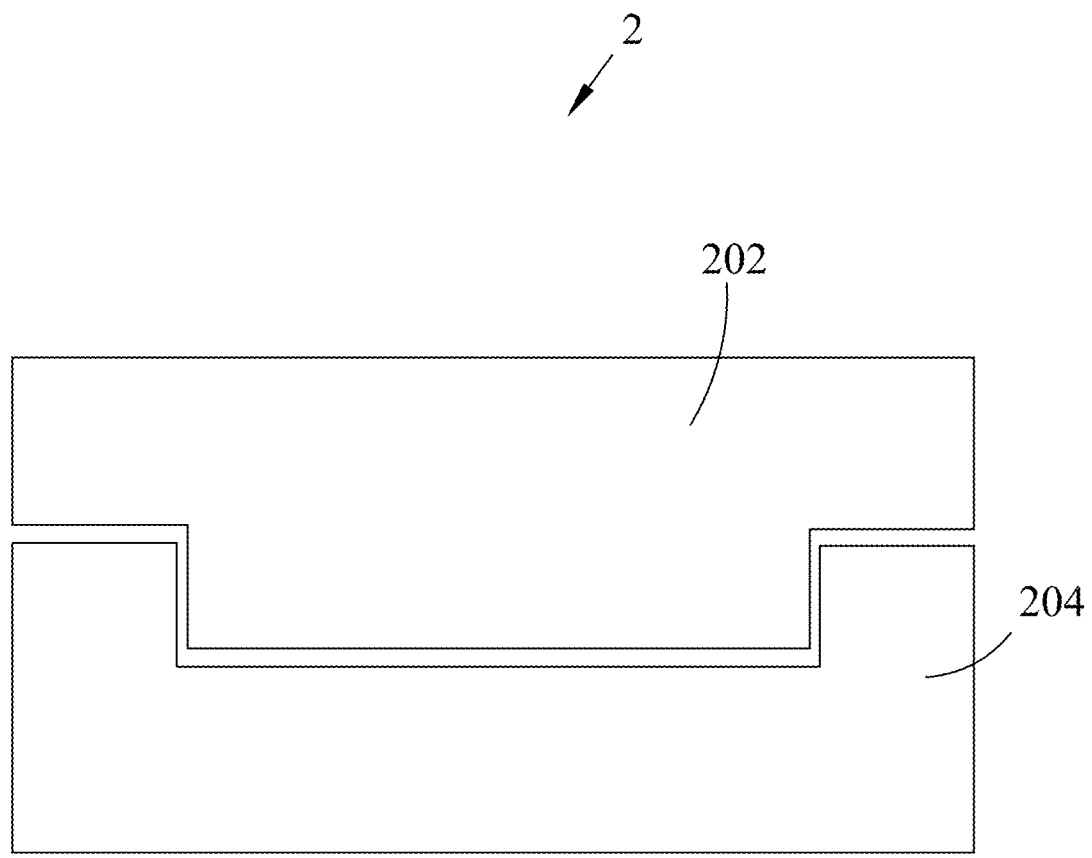
FIG. 2 is a schematic diagram of a thermoforming mold provided by an embodiment of the present disclosure.

As shown in FIGS. 1 to 2, the present disclosure provides a thermoforming method for a glass product. The thermoforming of the glass product needs to be equipped with a thermoforming mold 2, and the thermoforming mold 2 comprises a lower mold 204 (for example, a male mold) and an upper mold 202 (for example, a female mold) matched therewith. The lower mold 204 and the upper mold 202 are matched to form a cavity for molding the glass product.

The thermoforming method comprises a heating process, a pressurizing process, and a cooling process. In the thermoforming process of the glass product, the thermoforming mold 2 carries a glass sheet to sequentially move in the heating process, the pressurizing process, and the cooling process. The glass sheet is placed on the lower mold 204 usually.

Specifically, in the heating process, the glass sheet placed on the lower mold 204 of the thermoforming mold 2 can be heated so that the temperature of the glass sheet gradually rises from an initial temperature (room temperature) to a softening point temperature, thereby providing the glass sheet to be processed reaching the softening point temperature and above.

Alternatively, the heating process may further comprise a preheating stage and a heating stage. In the preheating stage, the glass sheet reaches the preheating temperature from the room temperature. In the heating stage, the glass sheet reaches the softening point temperature from the preheating temperature. The heating method can ensure that the glass sheet is sufficiently heated and the temperature of various portions of the glass sheet is relatively balanced to reduce the temperature difference.

When the glass sheet reaches the softening point temperature, it is transferred to the pressurizing process. In the pressurizing process, the upper mold 202 located above the lower mold 204 is matched with the lower mold 204 to apply a pressure to the glass sheet, so as to mold the glass sheet. The molded glass sheet becomes a glass product that can be used as a product accessory, such as a mobile phone glass screen, etc.

After pressurizing and molding, the glass product enters the cooling process. In the cooling process, the glass product is cooled. When the temperature of the glass sheet is reduced to a glass point transformation temperature and below, the glass product is cured and can maintain a stable form. At this time, a mold opening component may be provided. The upper mold 202 is opened by the mold opening component, so that the upper mold 202 and the lower mold 204 are separated. After the two molds are separated, the glass product is exposed from the thermoforming mold 2, and the glass product will not be limited by the upper mold 202 when shrinking and deforming. Therefore, the glass product no longer interferes with the upper mold 202, thus reducing the risk of cracking of the glass product in the cooling process, thereby improving the quality of the glass product and enhancing the manufacturing yield of the glass product.

When the glass product is continuously cooled to the room temperature, the thermoforming mold 2 carrying the glass product is conveyed from the inside of a molding chamber to the outside of the molding room. At this time, the glass product may be taken out from the lower mold 204 of the thermoforming mold 2.

When the upper mold 202 is opened, in order to prevent the upper mold 202 from being difficult to open due to the adhesion of the glass product with the upper mold 202, the thermoforming mold 2 may further comprises a pressing block, and the pressing block applies a downward pressure to the glass product. The glass product is tightly pressed by the pressing block, so that the glass product will not be adhered with the upper mold 202 and will smoothly fall onto the lower mold 204.

Alternatively, the cooling process may further comprise a first cooling stage and a second cooling stage, wherein the glass product is cooled from the softening point temperature to an intermediate temperature in the first cooling stage, and the glass product is cooled from the intermediate temperature to the room temperature in the second cooling stage.

In order to reduce the defects of the glass product during cooling, an optional solution is to slowly cool the glass product at the beginning of the cooling process, i.e., the first cooling stage, so as to reduce the deformation of the glass product during the cooling process and avoid large size deviation of the molded glass product. After the deformation of the glass product is stabilized, the second cooling stage can be entered. At this time, the glass product can be cooled at a cooling rate more than the cooling rate of the first cooling stage.

Wherein, the glass product may be cooled to the glass point transformation temperature in the first cooling stage, or the glass product may be cooled to the glass point transformation temperature in the second cooling stage.

The "slow cooling" herein refers to cooling at a rate less than a certain cooling rate, and those skilled in the art can make reasonable choices based on the composition of the glass product.

Figure 3:
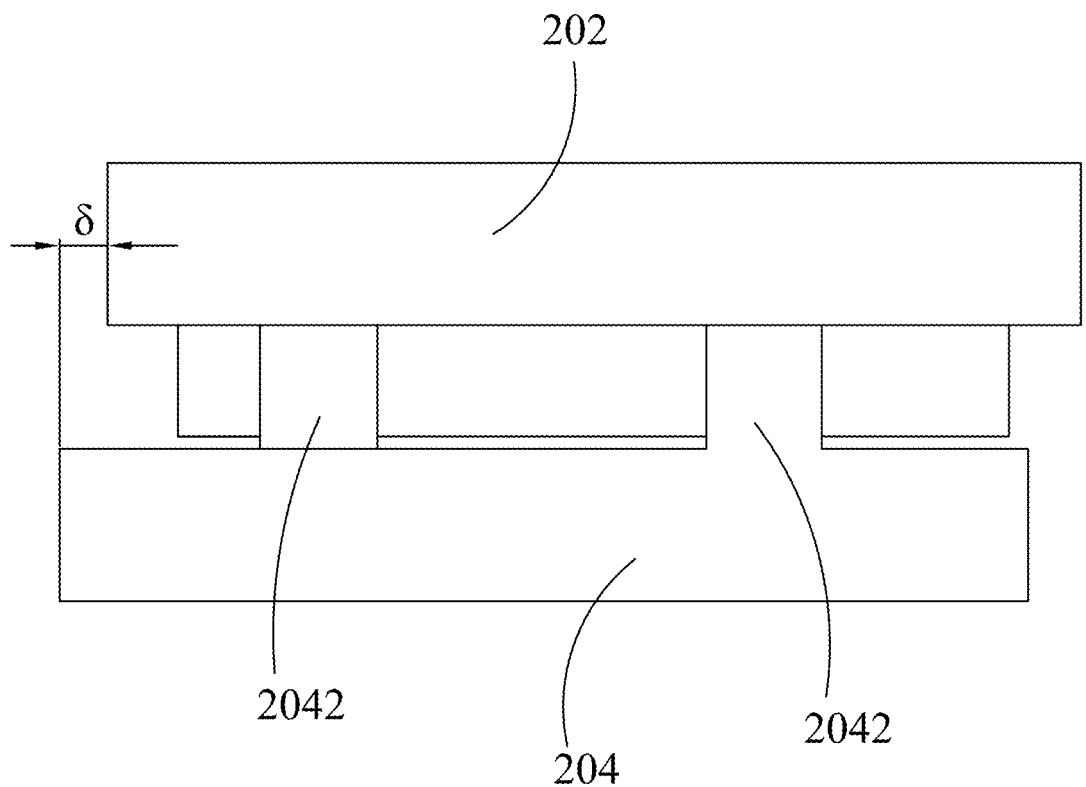
FIG. 3 is a schematic diagram illustrating dislocation between an upper mold and a lower mold in the thermoforming mold provided by the embodiment of the present disclosure.

Further, as shown in FIG. 3, in the cooling process, after the upper mold 202 is opened, the lower mold 204 carrying the glass product may also be moved by a preset distance δ along a horizontal direction. At this time, the upper mold 202 and the lower mold 204 are dislocated. Since a long time is needed for the cooling process, the upper mold 202 may be reset from an aspect of safety, so that the upper mold 202 is dislocatedly supported on the lower mold 204 to prevent the upper mold 202 from falling.

Specifically, in the embodiment as shown in FIG. 3, the lower mold 204 is provided with a vertical post 2042, and the upper mold 202 is provided with a through hole that is located opposite to the position of the vertical post 2042. When the upper mold 202 and the lower mold 204 are clamped together, the vertical post 2042 is inserted into the through hole. When the upper mold 202 and the lower mold 204 are dislocated, the upper mold 202 is supported on the vertical post 2042. At this time, the vertical post 2042 serves as a support post that supports the upper mold 202, so as to implement the dislocated support of the lower mold 204 on the upper mold 202.

It is easy to understand that since the upper mold 202 and the lower mold 204 are in a dislocated state, even if the upper mold 202 is reset, the upper mold 202 will not come into contact with the glass product.

In the thermoforming method provided by the present disclosure, in order to ensure the continuity of the thermoforming process and enhance the thermoforming efficiency, an assembly line operation is generally adopted for the thermoforming of the glass product, and the thermoforming mold 2 is flowed in each process in a stepping manner and the stepping distances between the processes are usually set to be equal.

In the foregoing solution, if the lower mold 204 has already been moved by a preset distance along the horizontal direction, position deviation may occur when the thermoforming mold 2 is flowed to next process at a preset stepping distance. Therefore, after the upper mold 202 is supported on the lower mold 204, the lower mold 204 may be reset so that the lower mold 204 and the upper mold 202 that are dislocated are moved back to a position of the lower mold 204 before being moved, so that it is still possible to move according to the preset stepping distance when stepping to next process, and it is possible to ensure that the thermoforming mold 2 is moved to an accurate position, thereby avoiding position deviation during the flow of the thermoforming mold 2.

Further, in the thermoforming process, an ejection member may further be provided. In the cooling process, after the upper mold 202 is opened, an acting force may be applied to the glass product by the ejection member so that the glass product and the lower mold 204 are relatively displaced. However, it should be noted that the glass product may be incompletely separated from the lower mold 204.

The "incomplete separation" mentioned herein refers to a case in which the glass product is still in contact with the lower mold 204, but adhesion does not occur between the two.

By an ejecting force exerted by the ejection member on the glass product, a gap may be left between the glass product and the lower mold 204. The gap may prevent the glass product from being limited by the lower mold 204 when shrinking, and avoid the glass product from being interfered with the lower mold 204, thus further reducing the risk of cracking of the glass product.

Based on the above-mentioned thermoforming method for a glass product, the present disclosure further provides a thermoforming device 100 for a glass product. The thermoforming device 100 uses the thermoforming method described in any of the above embodiments to mold a glass product.

Figure 4:
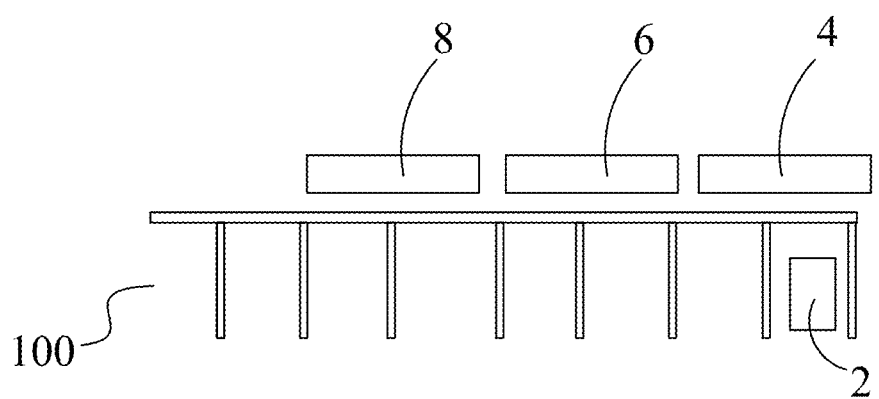
FIG. 4 is a schematic diagram of a partial structure of a thermoforming device provided by an embodiment of the present disclosure.

As shown in FIG. 4, the thermoforming device 100 comprises a heating station 4, a pressurizing station 6, a cooling station 8 and the thermoforming mold 2 in any one of the above embodiments. The thermoforming mold 2 comprises a lower mold 204 and an upper mold 202 arranged above the lower mold 204 and matched therewith. The thermoforming mold 2 carries a glass sheet to sequentially pass through the heating station 4, the pressurizing station 6, and the cooling station 8 to achieve heating, pressurizing and forming, and cooling of the glass sheet.

Specifically, the heating station 4 is configured to heat the glass sheet at a softening point temperature and above. The pressurizing station 6 applies a pressure to the glass sheet at the softening point temperature and above by the thermoforming mold 2 to mold the glass sheet into a glass product. The cooling station 8 is configured to cool the temperature of the glass product to a glass point transformation temperature and below and finally to a room temperature.

Specifically, as shown in FIGS. 5 to 10, thermoforming device 100 further comprises a mold opening component 10, the mold opening component 10 has a movement stroke, and the mold opening component 10 is arranged to be capable of opening the upper mold 202 in the movement stroke. When the upper mold 202 is opened, the temperature of the glass product should drop to the glass point transformation temperature and below.

After the upper mold 202 is opened by the mold opening component 10, the glass product is exposed from the thermoforming mold 2 and is continuously cooled. During the cooling process, the glass product will not be limited by the upper mold 202, then the cracking rate of the glass product is reduced, and the manufacturing yield of the glass product is enhanced.

Figure 5:
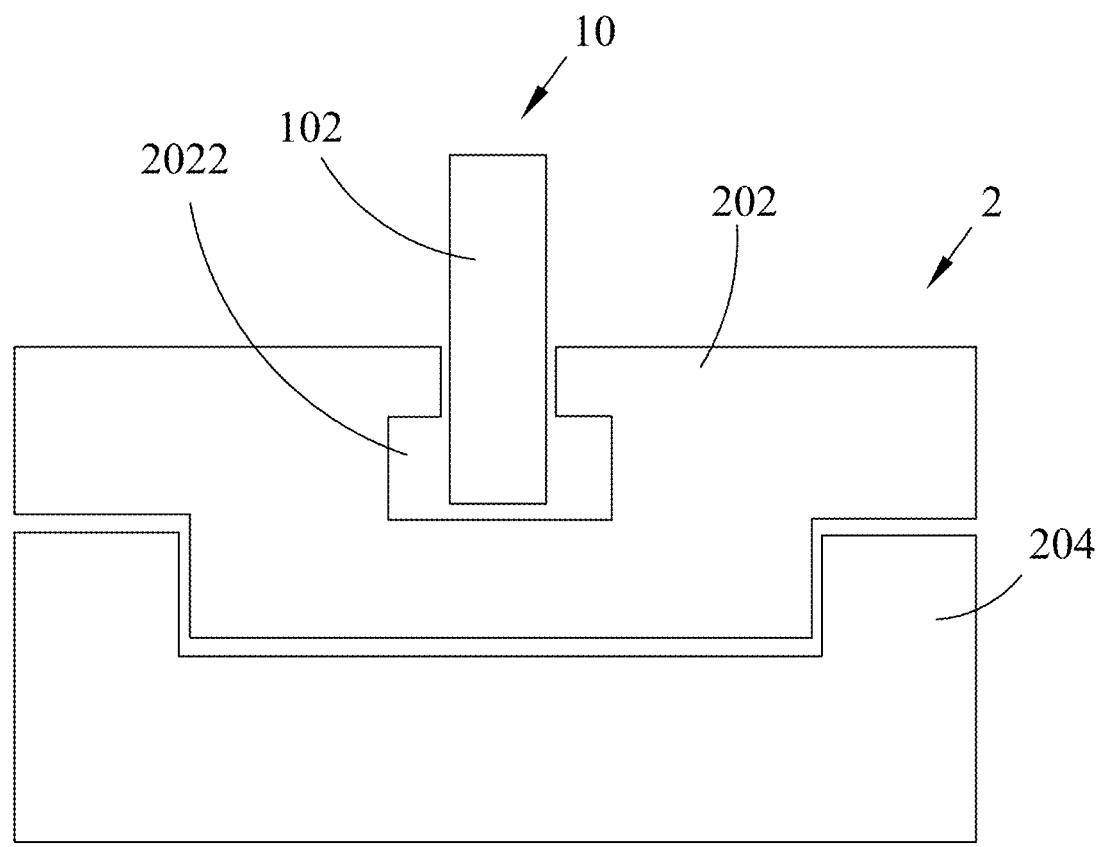
FIG. 5 is a schematic diagram illustrating a force applying portion in a placed position in a mold opening component provided by an embodiment of the present disclosure.

The mold opening component 10 has various embodiments. Referring to FIG. 5 and Figure, an embodiment of the mold opening component 10 comprises a driving portion (not shown in the figures) and a force applying portion 102. The driving portion is in drive connection with the force applying portion 102. The driving portion serves as an actuating member. The force applying portion 102 serves as_an intermediate connector for being contacted with the upper mold 202. The driving portion applies an acting force to the upper mold 202 via the force applying portion 102.

In some embodiments, the driving portion may be an air cylinder, a hydraulic cylinder, a motor, etc. In some other embodiments, the driving portion may also be an elastic mechanism, which is not limited in the present disclosure.

Please refer to FIG. 5 continuously. The upper mold 202 is provided with a connecting trough 2022, and the force applying portion 102 is a rod-shaped structure. The force applying portion 102 can be respectively located in two positions. One position is a placed position when the force applying portion 102 is placed into the connecting trough 2022 (see FIG. 5), and the other position is that a working position where the force applying portion 102 applies an acting force to the upper mold 202 and separates the upper mold 202 from the lower mold 204 (see FIG. 6). In a plane perpendicular to a force application action line of the force applying portion 102, the placed position is at an angle to the working position. The force applying portion 102 can apply an acting force to the upper mold 202 at the working position, and under the acting force, the upper mold 202 is separated from the lower mold 204.

Figure 6:
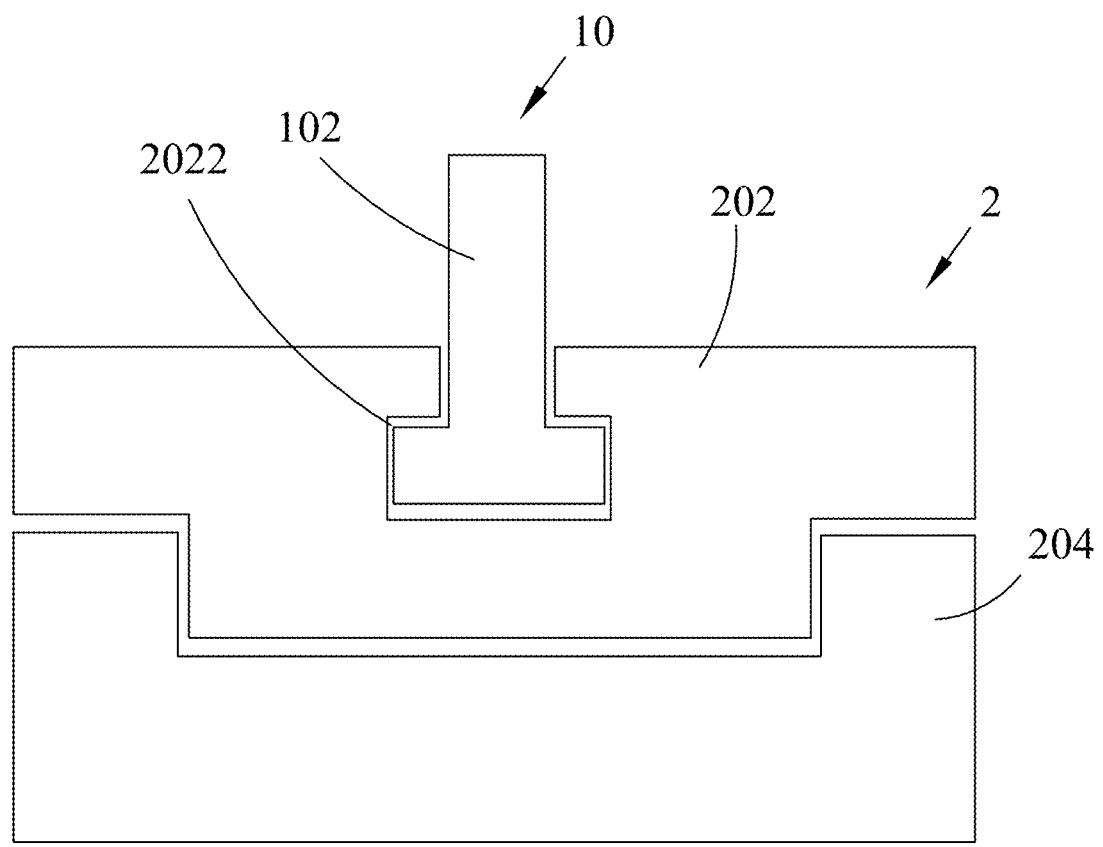
FIG. 6 is a schematic diagram illustrating the force applying portion in a working position in the mold opening component provided by the embodiment of the present disclosure.

It can be seen from FIG. 6 that one end of the force applying portion 102 is a T-shaped end. When the force applying portion 102 is in the placed position, the size of an opening of the connecting trough 2022 allows to place in a horizontal segment of the T-shaped end. At this time, the horizontal segment of the T-shaped end is placed in the connecting trough 2022. Then, the force applying portion 102 is rotated to a preset angle, such as 30 degrees, 60 degrees, or 90 degrees, and a central line of rotation is an axis of a vertical segment of the T-shaped end. At this time, the force applying portion 102 is at the working position. At the working position, the size of the horizontal segment of the T-shaped end is larger than the size of the opening of the connecting trough 2022, and the force applying portion 102 cannot escape from the opening. At this time, when the driving portion applies an acting force to the upper mold 202 via the force applying portion 102, the upper mold 202 is opened.

Figure 7:
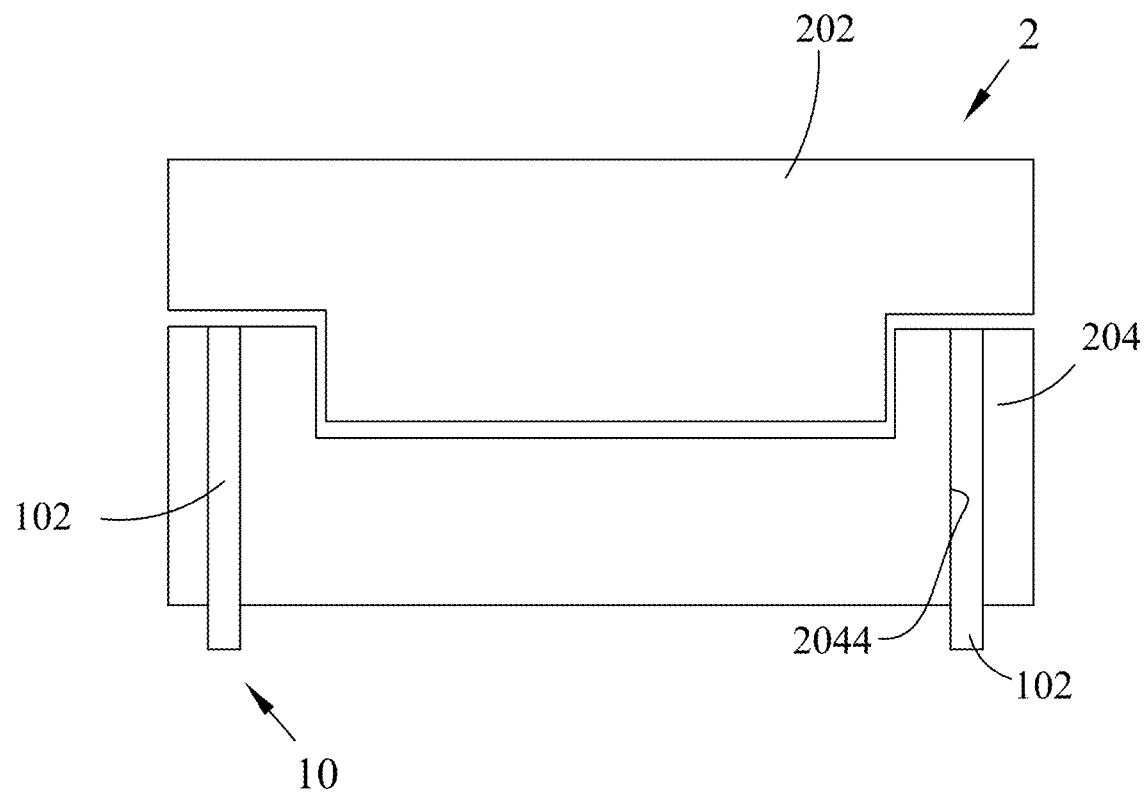
FIG. 7 is a schematic diagram of another embodiment of the mold opening component provided by the embodiment of the present disclosure.

In another embodiment, as shown in FIG. 7, the lower mold 204 is provided with a through hole 2044, and the force applying portion 102 applies a pushing force to a lower surface of the upper mold 204 via the through hole 2044 to open the upper mold 202.

Figure 8:
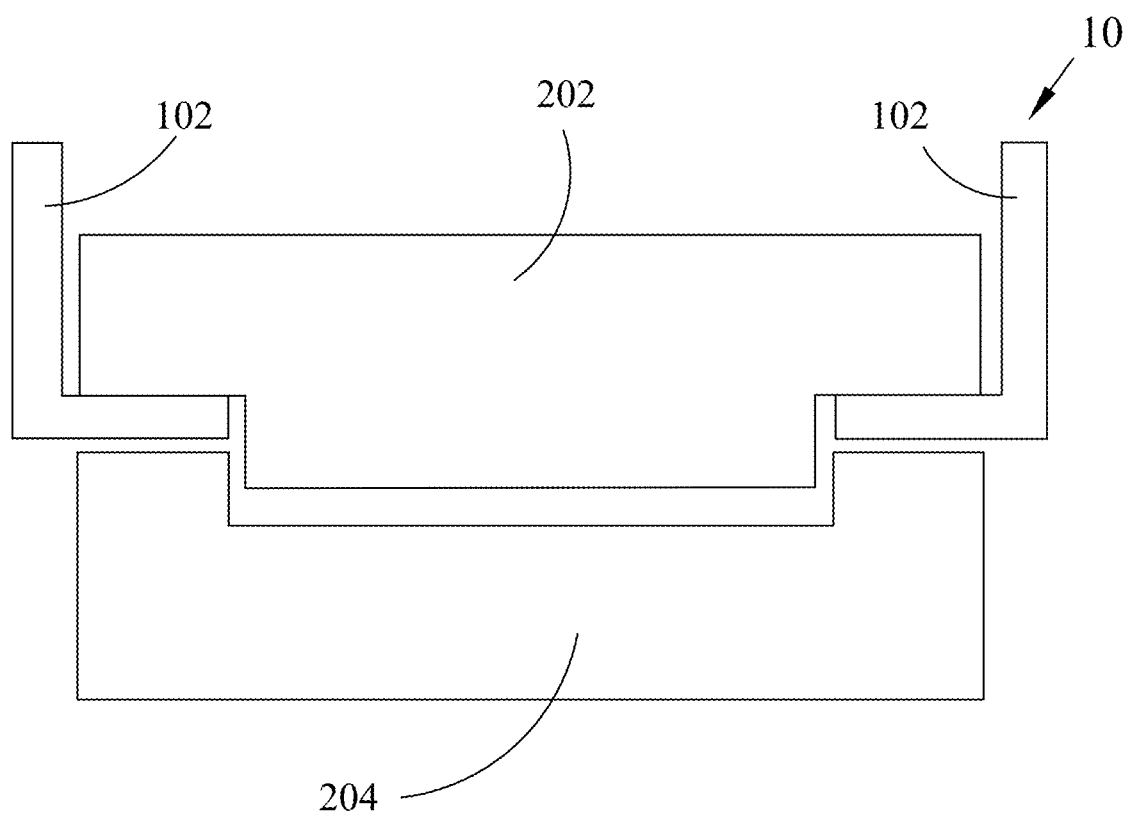
FIG. 8 is a schematic diagram of another embodiment of the mold opening component provided by the embodiment of the present disclosure.

In another embodiment, as shown in FIG. 8, the force applying portion 102 is arranged in a reserved gap between the upper mold 202 and the lower mold 204 and has a plate like structure. When the driving portion generates a driving force, the force applying portion 102 generates a movement stroke. The force applying portion 102 is in contact with the lower surface of the upper mold 202, and drives the upper mold 202 to be separated from the lower mold 204.

In the embodiments as shown in FIG. 7 and FIG. 8, the number of the force applying portion 102 is two to ensure the balance of forces.

In the above embodiments, the structure of the mold opening component 10 is relatively simple and convenient to implement, and the mold opening component 10 and the thermoforming mold 2 do not need to be connected by a fastener, and the mold opening operation is simple and convenient.

Figure 9:
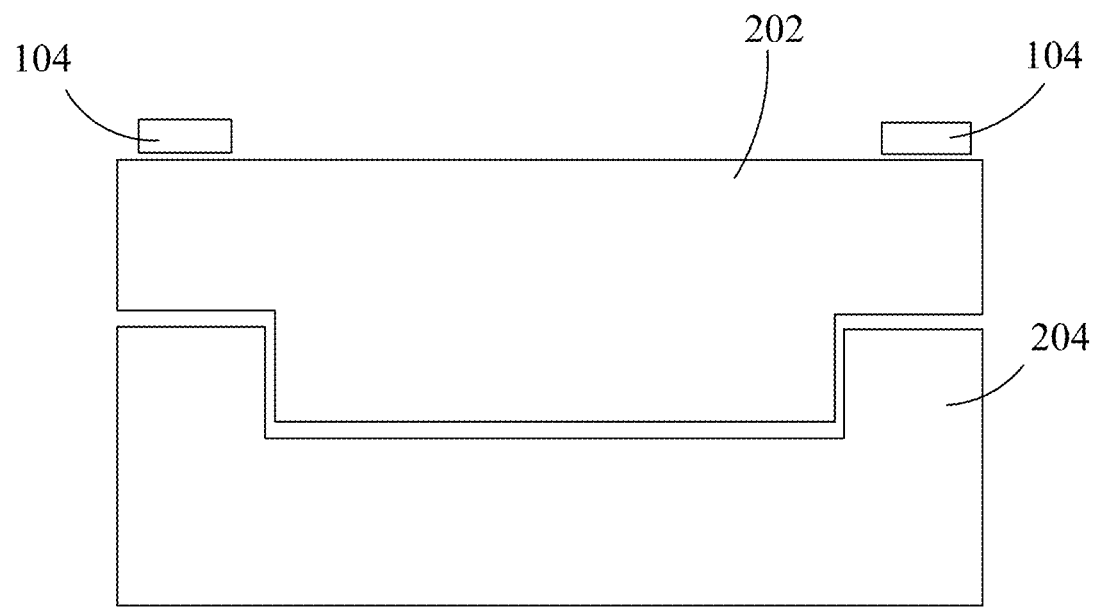
FIG. 9 is a schematic diagram of the mold opening component comprising a magnetic portion provided by the embodiment of the present disclosure.

As shown in FIG. 9, in some other embodiments, the mold opening component 10 may further comprises a driving portion and a magnetic mechanism 104. The magnetic portion 104 is effectively connected with the upper mold 202 by magnetic attraction, and the magnetic portion 104 may be a permanent magnet or an electromagnet.

Figure 10:
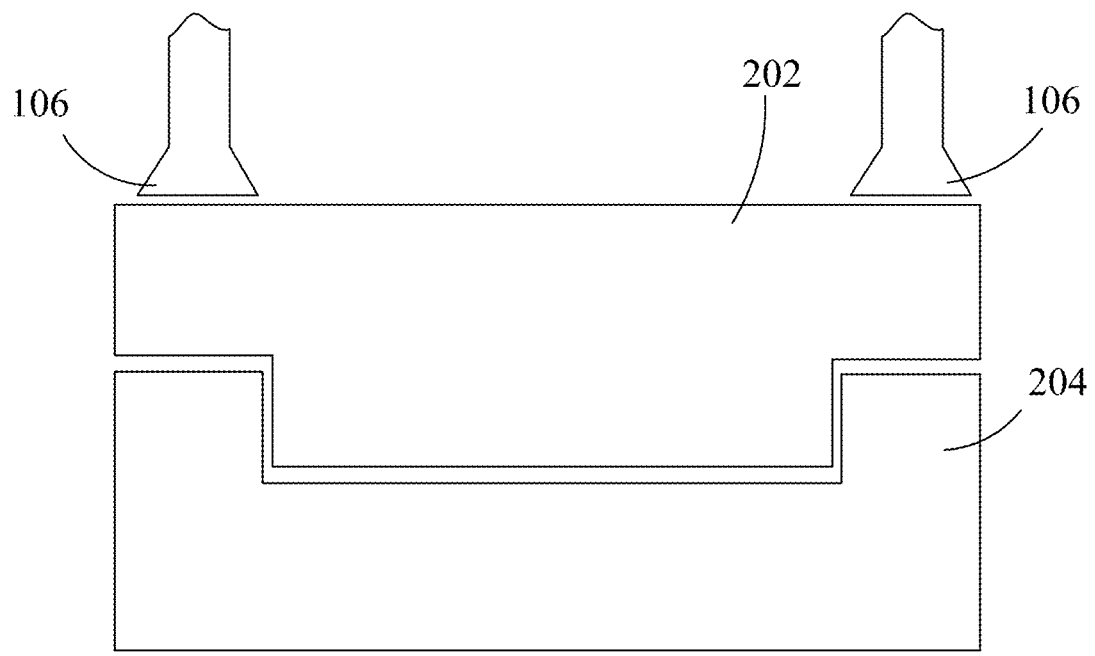
FIG. 10 is a schematic diagram of the mold opening component comprising an adsorption portion provided by the embodiment of the present disclosure.

As shown in FIG. 10, the mold opening component 10 may further comprise a driving part and an adsorption portion 106, wherein the adsorption portion 106 is effectively connected with the upper mold 202 by vacuum adsorption.

In the embodiments as shown in FIG. 9 and FIG. 10, the magnetic portion 104 and the adsorption portion 106 may be in direct contact with the upper mold 202, and keep connection with the upper mold 202 by a magnetic force and an adsorption force, which is simpler to implement, and has higher efficient operation than other embodiments.

Moreover, the thermoforming device 100 provided by the present disclosure further comprises an auxiliary driving portion (not shown in the figures), wherein the auxiliary driving portion is in drive connection with the lower mold 204 so that the lower mold 204 is moved by a preset distance along a horizontal direction and is dislocated with the upper mold 202.

Further, the thermoforming device 100 further comprises a holding portion 12, for example, the holding portion 12 in an embodiment is implemented as the vertical post 2042 in FIG. 3, and is arranged on the lower mold 204, and the upper mold 202 is provided with a through hole corresponding to the vertical post 2042. When the upper mold 202 and the lower mold 204 are clamped together, the vertical post 2042 is embedded in the through hole. When the upper mold 202 and the lower mold 204 are dislocated from each other, the vertical post 2042 is no longer facing the through hole, and the vertical post 2042 is supported on the lower surface of the upper mold 202. At this time, the vertical post 2042 can hold the upper mold 202 and the lower mold 204 in an opened state. FIG. 3 shows a schematic diagram of holding the upper mold 202 and the lower mold 204 that are dislocated in the opened state by the vertical post 2042.

In some other embodiments, the holding portion 12 may be configured as a separate part, such as a cushion block, and the cushion block is attached between the upper mold 202 and the lower mold 204 so as to support the upper mold 202.

Figure 11:
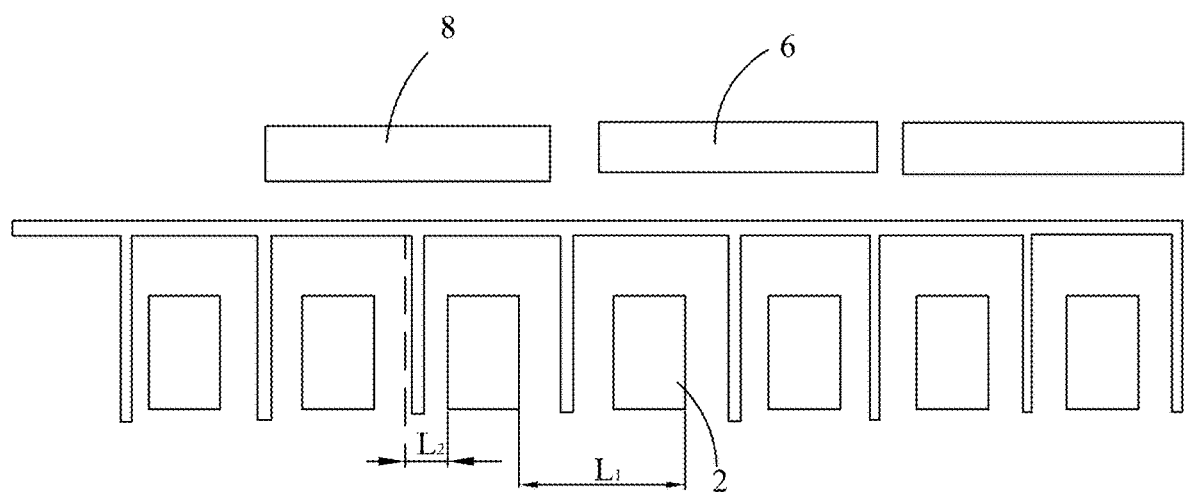
FIG. 11 is a schematic diagram illustrating a thermoforming mold stepped between a pressurizing process and a cooling process in thermoforming device provided by an embodiment of the present disclosure.

As shown in FIG. 11, assuming that the stepping distance between the pressurizing station 6 and the cooling station 8 is $L_1$, the glass sheet is stepped with the thermoforming mold 2 by the distance $L_1$ so as to enter the cooling station 8 from the pressurizing station 6. In the cooling station 8, when the temperature of the thermoforming mold 2 drops to the glass point transformation temperature, the mold opening component 10 applies an acting force to the upper mold 202 to open the thermoforming mold 2.

After the thermoforming mold 2 is opened, the lower mold 204 is driven to step forward by a distance $L_2$ by the auxiliary driving portion, so that the upper mold 202 and the lower mold 204 are dislocated.

When the upper mold 202 and the lower mold 204 are dislocatedly placed, the lower mold 204 is driven and moved by the distance $L_2$ towards the opposite direction of the stepping direction at the moment, i.e., the lower mold 204 is reset to the position before moving, so that the thermoforming mold can be continuously moved to next station in accordance with the stepping distance $L_1$ between the stations.

In addition, the thermoforming device 100 provided by the present disclosure may further comprise an ejection member (not shown in the figures). The ejection member has an ejection stroke. After the upper mold 202 is opened in the cooling process, the ejection member may apply an acting force to the glass product, so that the glass product and the lower mold 204 are displaced.

The ejection member causes a gap between the glass product and the lower mold 204, which reduces the interference of the glass product with the lower mold 204 during shrinking, thereby further improving the molding quality of the glass product and further reducing the risk of cracking. The ejection member may be in contact with the glass product via the through hole arranged in the lower mold 204.

The glass product may be incompletely detached from the lower mold 204. The "incompletely detached" refers to a case in which the glass product is still in contact with the lower mold 204, but the two will not adhere with each other.

The ejection member may be driven by a spring, a motor, a cylinder, a hydraulic cylinder, a nut screw mechanism, etc., and will not be elaborated herein.

Those described above are merely preferred embodiments of the disclosure, but are not intended to limit the disclosure. Any change, equivalent substitution, and improvement made within the spirit and principle of the disclosure shall fall within the protection scope of the disclosure.

What is claimed is:

1. A thermoforming method for a glass product, comprising the following steps of:
    providing a thermoforming mold, wherein the thermoforming mold comprises a lower mold and an upper mold arranged above the lower mold and matched therewith; providing a mold opening component; a pressurizing process, wherein a glass sheet placed in the thermoforming mold and at a softening point temperature and above is hot-pressed to form a glass product; a cooling process, wherein the glass product placed in the thermoforming mold is cooled, and when the temperature of the glass product drops to a glass point transformation temperature and below, the upper mold is opened by the mold opening component so that the upper mold is separated from the lower mold; and taking the glass product out when the temperature of the glass product in the thermoforming mold drops to a room temperature;
    after the upper mold is opened, moving the lower mold carrying the glass product by a preset distance along a horizontal direction; resetting the upper mold so that the upper mold is dislocatedly supported on the lower mold; and resetting the lower mold; wherein the thermoforming mold is flowed in the thermoforming method in a stepping manner by moving according to a preset stepping distance when stepping between the pressurizing process and cooling process.

2. The thermoforming method according to claim 1, further comprising:
    providing an ejection member, and in the cooling process, after the upper mold is opened, applying an acting force to the glass product by the ejection member so that the glass product and the lower mold are displaced, and the glass product and the glass mold are incompletely separated.

* * * * *